United States Patent [19]

Takarabe et al.

[11] Patent Number: 5,705,560
[45] Date of Patent: Jan. 6, 1998

[54] AQUEOUS COATING COMPOSITION

[75] Inventors: Kunihide Takarabe, Washimiya-machi; Yoshio Tamura, Tokorozawa; Takayuki Sugiyama, Warabi; Tomohiro Shinoda, Ohmiya, all of Japan; James Keith Bardman, Hellertown, Pa.

[73] Assignee: Rohm and Haas Company, Philadelphia, Pa.

[21] Appl. No.: 602,674

[22] Filed: Feb. 16, 1996

[30] Foreign Application Priority Data

Feb. 16, 1995 [JP] Japan ................... 7-051979

[51] Int. Cl.$^6$ ..................... C08K 3/10; C08K 5/16
[52] U.S. Cl. .............. 524/556; 524/430; 524/432; 524/440; 524/560
[58] Field of Search ................. 524/556, 430, 524/432, 440, 560

[56] References Cited

U.S. PATENT DOCUMENTS 4,839,198  6/1989  Lonis et al. .................... 427/137
5,527,853  6/1996  Landy et al. ................... 524/521

FOREIGN PATENT DOCUMENTS 66108   5/1982   European Pat. Off.
409459  7/1990   European Pat. Off.
594321  10/1993  European Pat. Off.

Primary Examiner—Vasu Jagannathan
Assistant Examiner—John J. Guarriello
Attorney, Agent, or Firm—Ronald D. Bakule

[57] ABSTRACT

This invention is a new aqueous paint composition, and its object is to provide a quick-drying paint composition that has a low sensitivity to temperature and has a high rubber elasticity.

An aqueous paint composition, comprising (1) a latex which is a film-forming latex polymer having anionic property, where the solubility of the monomers to form the polymer, excluding the monomers that show anionic property, is 0.01–1.50 g per 100 g of water, (2) a water-soluble or water dispersible polymer formed from a monomer mixture containing at least 20 weight % of amine functional group-containing monomer, and (3) an amount of volatile base sufficient to raise the pH of the composition to a sufficiently high level to bring essentially all amine functional groups to a nonionic state.

12 Claims, No Drawings

AQUEOUS COATING COMPOSITION

This invention relates to an aqueous paint composition, and particularly to a paint composition that has a low sensitivity to temperature, high rubber elasticity, and dries quickly.

Even though numerous attempts have been made to develop new quick-drying aqueous paint composition, a paint that can be coated and dried at extremely low temperature and high humidity has yet to be developed.

For example, speed of the painting work is controlled by the time required by each layer or the coated film to cure or dry. In addition, quick-drying exterior paint requires soil resistance during the initial drying period after it was coated and also a resistance against rain, snow and wind, etc. If the paint dries slowly, these related problems will turn worse in a certain environment, particularly in cold, wet, or humid weather.

Attempts were made to lower the level of water in the paint formula, with a hope to shorten the curing time of the paint. However, such attempts tend to create a paint formula that is too viscous for coating.

And, a quick-drying paint that can not be washed off by rain and does not leave behind the tread pattern of a tire when the tire contacted with the surface of the road, is required as the paint to coat the road surface. Even though the solvent type paint can dry quickly, it creates serious safety, health and environmental problems. Ordinary aqueous paint does not dry quickly enough under cold, wet or humid conditions. Attempts to eliminate these problems have resulted in coating that requires multiple steps and a problem in storage stability.

For example, European Patent Application No. 200,249 discloses a way of coating an aqueous dispersion of a polymer on the road, and subsequently contacting the composition with the secondary agent that contains water-soluble salt, to quickly dry the coated film so that it can endure washing by rain even 5 minutes after coating.

European Patent Application No. 66,108 discloses an aqueous composition for labeling the road surface, which is a mixture made from a pure acrylic resin, carboxylated styrene/dibutyl fumarate copolymer, and high molecular polyfunctional amine such as polypropylene imine. This composition tends to lose its storage stability when it is stored for more than 48 hours, and a polyfunctional amine must be added to regain the activity.

And, Japanese Kokai Patent HEI 3-157463 (1991) discloses a quick-curing aqueous coating composition that is stable in storage, and contains an emulsion polymer which has a Tg of higher than about 0° C., and is stabilized by having an anionic property. And, Japanese Patent Application HEI 6-145590(1994) discloses an aqueous paint composition for exterior use that contains a film-forming latex polymer having anionic property.

None of the paint composition described in the above-said applications could be coated and dried at extremely low temperature and high humidity, but such practice is possible with the paint composition of this invention. Furthermore, none of these paints show the characteristic effects of this invention, including low sensitivity to temperature.

And, Japanese Patent SHO 47-15597(1973) discloses a composition that contains a polyvalent metal, which is an aqueous composition for creating gloss. The purpose of this flooor polishing composition is to suppress and prevent re-dispersion of the previously applied gloss during application of a new gloss, and therefore its object is entirely different from the present invention.

PROBLEMS TO BE SOLVED BY THE INVENTION

The present invention intends to propose a new paint composition which has a low sensitivity to temperature, has a high rubber elasticity, and can dry quickly.

MEANS TO SOLVE THE PROBLEMS

This invention provides a quick-drying aqueous paint composition, comprising (1) a latex which is a film-forming latex polymer having anionic property, where the solubility of the monomers to form the polymer, except the monomers having anionic property, is 0.01–1.5 g per 100 g of water, (2) water-soluble or water-dispersible polymer formed from a monomer mixture containing at least 20 weight % of amine functional group-containing monomers, and (3) an effective amount of volatile base to raise the pH of the composition to a sufficiently high level to bring essentially all amine functional groups to a nonionic state. Incidentally, the terminology "quickdrying property" as used heretofore in this Specification means a property to dry the composition quicker than the conventional composition.

And, this invention provides also an aqueous paint composition, comprising (1) a latex which is a film-forming latex polymer having anionic property, where the solubility of the monomers to form the polymer, excluding the monomer that has anionic property, is 0.01–1.5 g per 100 g of water, and (2) a water-soluble or waterdispersible polyvalent metal, preferably zinc.

And, this invention provides also a quick-drying aqueous paint composition, comprising (1) a latex which is a film-forming latex polymer having anionic property, where the solubility of the monomers to form the polymer, excluding the monomer having anionic property, is 0.01–1.5 g per 100 g of water, and modified by water-soluble or water-dispersible polyvalent metal, (2) a water-soluble or water-dispersible polymer formed from a monomer mixture containing at least 20 weight % of amine functional group-containing monomer, and (3) an effective amount of volatile base to raise the pH of the composition to a sufficiently high level to bring essentially all amine functional groups to a nonionic state.

In the above-said three embodiments of aqueous paint compositions, the solubility of the monomers to form the film-forming latex polymer having anionic property, excluding the monomers that have anionic property, is preferably 0.01–0.9 g per 100 g of water, and 0.01–0.2 g per 100 g of water is even more desirable. And, the amount of water-soluble or water-dispersible polymers formed from the amine functional group-containing monomers is preferably 0.02–10 weight % of the total combined amount of the latex polymer and the water-soluble or water-dispersible polymer.

Of the monomers to form the film-forming latex polymer having anionic property to be used in this invention, the solubility of that monomers, excluding the monomers having anionic property, must be 0.01–1.50 g per 100 g of water.

Incidentally, degree of solubility of monomers in water is known. For example, data are available in Polymer Handbook (Second edition, J. Brandrup, E. H. Immergut, Editors, John Wiley & Sons) and also in Merk Index (Eleventh Edition, Merck & Co., Inc. (Rahway, N.J., U.S.A.). Data of typical monomers are shown in Table 1 and Table 2.

TABLE 1

Solubility of major methacrylic monomers in water

| Monomer species | Solubility in water (%, 25° C.) |
|---|---|
| MAA | ∞ |
| MMA | 1.35 |
| EMA | 0.46 |
| BMA | 0.03 |
| IBMA | 0.03 |
| HMA | 0.00 |
| CHMA | 0.00 |
| HEMA | ∞ |
| HPMA | ∞ |
| GMA | 1.45 |

TABLE 2

Solubility of other monomers in water

| Monomer species | Solubility in water (%, 25° C.) |
|---|---|
| St | 0.029 |
| AN | 7.30 |
| MAN | 2.57 |
| VAC | 2.3 |
| AAm | 20.4* |
| 2EHA | 0.01 |

*Temperature of water = 25° C.

The "glass transition temperature" or "Tg" used heretofore in this Specification is the glass transition temperature of a polymer, calculated by Fox's equation [Bulletin of American Physics Society, 1, 3, page 123 (1956)]: Equation 1;

$$1/Tg = [W_1/T_{g(1)}] + [W_2/T_{g(2)}]$$

For copolymer, $W_1$ and $W_2$ represent the weight fraction of two types of comonomers, and $T_{g(1)}$ and $T_{g(2)}$ represent the glass transition temperatures (unit: absolute temperatures) of respective homopolymers.

Film-forming polymer

The aqueous paint composition of this invention requires the film-forming latex polymer having anionic property. The terminology "latex" used heretofore in this Specification means water-insoluble polymers that can be prepared by ordinary polymerization technology, such as emulsion polymerization process. Latex polymer is formed from any monomers or monomer mixtures that can form a water-insoluble latex polymer to form a film by coating.

Tg of the latex polymer is controlled only by the application that uses paint composition. For example, if the paint is to be coated in an open field in hot summer weather, the composition of latex polymer can be selected in such a way to give a higher Tg than when the paint is to be coated in cold winter weather. Generally speaking, Tg of the latex polymer is from about −55° C. to about 50° C. Because the paint that contains a latex polymer having lower than −55° C. of Tg is too soft and too viscous for coating, it is not useful for general purpose. And, since the paint that contains a latex polymer having higher than 50° C. of Tg is too hard to form a film at a higher temperature than the atmospheric temperature, it is not useful for general purpose. Polymers having a Tg from about −45° C. to about 20° C. are preferred, and polymers having a Tg from about −40° C. to about 5° C. are particularly desirable.

This invention can be practiced also by using polymers having a more complicated morphology, such as core-shell particles. Those polymers with complicated morphology normally show multiple Tgs. While one of the multiple Tg of these polymers may be beyond the −55°–50° C. range, the average Tg or effective Tg of the polymer must be in −55°–50° C. range.

Even though the anionic property of the film-forming latex polymer can be created by any one of several methods, the most common methods are the method of using a surface active agent or a dispersing agent as the stabilizer during the emulsion polymerization process or the method of adding such a surface active agent or dispersing agent to the emulsion after the polymerization. Nonionic surface active agent may exist in the latex during or after polymerization of the anionically stabilized latex. Followings are the examples of useful surface active agents and dispersing agents: salts of aliphatic rosins and naphthenic acid, products formed by condensing naphthenesulfonic acid and low molecular formaldehyde, carboxylic acid polymers and copolymers having appropriate hydrophilic-oleophilic balance, higher alkyl sulfates such as sodium laurylsulfate, alkylaryl sulfonates such as dodecylbenzene sulfonate, sodium salts or potassium salts of isopropylbenzene sulfonic acid or isopropyl naphthalene sulfonic acid, sulfosuccinates such as sodium dioctyl sufosuccinate, alkaline metal salts of higher alkyl sulfosuccinates such as sodium octyl sulfosuccinate, sodium N-methyl-N-palmitoyl taurate, sodium oleyl isetionate (SIC), alkaline metal salts of alkylaryl polyethoxyethanol sulfuric acid or sulfonic acid, such as sodium t-octylphenoxypolyethoxy ethanol sulfate having 1–5 oxyethylene units and various other anionic surface active agents and dispersing agents well known in this technical field.

Another type of latex polymer having anionic property is obtained as a result of including a small amount of acidic group in the polymer. In this case, the acidic group may be in salt form, such as alkaline metal salts or ammonium salts. Examples of such acidic groups are derived from fragments of the incorporated initiator, maleic acid, vinylsulfonic acid, crotonic acid, acrylic acid, methacrylic acid, itaconic acid and so on.

The third useful type of latex polymer having anionic property is latex polymer that contains neutralized basic monomers such as acrylamide, methacrylamide and so on.

Latex polymer may have more than one type of anionic property.

Latex polymers having anionic property can be prepared by any of the known methods. Such publically known methods are described clearly in the text under the title "Emulsion Polymerization: Theory and Practice" written by D. C. Blackley and published by Wiley Co. in 1975, and "Emulsion Polymerization" written by F. A. Bovey, et al. and published by Interscience Publishers Co. in 1965. Generally, latex polymers are polymers or copolymers prepared from monomers, such as methyl acrylate, ethyl acrylate, butyl acrylate, 2-ethylhexyl acrylate, decyl acrylate, methyl methacrylate, ethyl methacrylate, butyl methacrylate, styrene, butadiene, ethylene, vinyl acetate, vinyl esters of "versatic" acids ($C_{10}$ and $C_{11}$ tertiary monocarboxylic acids) [these vinyl esters are known also as "vinyl versatates"], vinyl chloride, vinyl pyridine, vinylidene chloride, acrylonitrile, chloroprene, acrylic acid, methacrylic acid, itaconic acid, maleic acid and fumaric acid, a,b-ethylenic monomers and its esters, and so on. Particularly, polymers and copolymers of acrylic esters and methacrylic esters are preferred, and they are produced preferably by the method described in the "Emulsion Polymerization of Acrylic Monomers" published by Rohm and Haas Company, Philadelphia, Pa., U.S.A., in May, 1966.

Latex polymer is prepared by polymerization, preferably, of the monomer mixture containing butyl methacrylate, and the amount of butyl methacrylate is 1–70 weight %, preferably 10–30 weight % of the monomer mixture.

And, latex polymer is prepared by polymerization, preferably, of the monomer mixture containing 2-ethylhexyl acrylate, and the amount of 2-ethylhexyl acrylate is 93–22 weight %, preferably 82–43 weight % of the monomer mixture.

As stated earlier, with the film-forming latex polymer having anionic property to be used in this invention, the solubility of the monomers to form the polymer, excluding the monomers having anionic property, must be 0.01–1.50 g per 100 g of water.

"Monomers excluding the monomers having anionic property", means monomers excluding the acidic group-containing monomers, if a small amount of acidic group is included in the polymer to create the anionic property in a manner described above as the second method of introducing anionic property. Solubility is the solubility at 25° C. Solubility is believed to be additive, and if proportions of each monomer is known, solubility of the monomer mixture can be determined by calculation.

Here, solubility is a measure of the balance of hydrophilic property and hydrophobic property. Quick dryability of the polymer and property of the coated film can be regulated by adjusting the balance of the hydrophilic property and hydrophobic property of the monomer mixture that forms the latex polymer, using the solubility as a marker.

Amine-containing polymer

The quick-drying aqueous paint composition of this invention requires an amine-containing polymer formed from at least 20 weight % of amine functional group-containing monomer. Polymers containing at least 50 weight % of amine functional group-containing monomer are preferred. And, preferred average molecular weight of this water-soluble or water-dispersible amine-containing polymer is from about 5,000 to about 100,000.

Examples of the amine functional group-containing monomers are as follows:

1. Aminoalkylvinyl ethers or sulfides where the alkyl group may be a linear type or branched chain type, having 2–3 carbon atoms, and the nitrogen atom may be a primary nitrogen atom, secondary nitrogen atom or tertiary nitrogen atom [U.S. Pat. No. 2,879,178]. In the latter examples, one of the remaining hydrogen atoms may be substituted by alkyl group, hydroxyalkyl group or alkoxyalkyl group, and the alkyl component may have 1–4 carbon atoms, preferably only one carbon atom.

Specific examples are as follows: b-aminoethylvinyl ether; b-aminoethylvinyl sulfide; N-monomethyl-b-aminoethylvinyl ether or sulfide; N-monoethyl-b-aminoethylvinyl ether or sulfide; N-monobutyl-b-aminoethylvinyl ether or sulfide; and N-monomethyl-3-aminopropylvinyl ether or sulfide.

2. Acrylamide or esters of acrylic acid, such as those represented by the following formula (II).

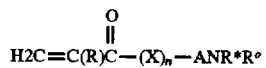

In the above formula (II),

R is H or CH$_3$;

n is 0 or 1;

X is O or N(H); when n is zero, A is O(CH$_2$)$_X$ (X is 2–3) or (O-alkylene)$_y$[(O-alkylene)$_y$ is a poly(oxyalkylene) group whose molecular weight is in 88–348 range, and individual alkylene group is ethylene or propylene which may be identical or different], and when n is 1, A is an alkylene group having 2–4 carbon atoms;

R* is H, methyl or ethyl group;

R$_1$ is H, methyl or ethyl group; and

R$°$ is H, phenyl, benzyl, methylbenzyl, cyclohexyl or C$_1$–C$_6$ alkyl group.

Examples of the compounds represented by the formula (II) are indicated in the following: dimethylaminoethyl acrylate or methacrylate; b-aminoethyl acrylate or methacrylate; N-b-aminoethyl acrylamide or methacrylamide; N(monomethylaminoethyl)-acrylamide or methacrylamide; N-(mono-n-butyl)-4-aminobutyl acrylate or methacrylate; methacryloxyethoxyethylamine; and acryloxypropoxypropyl amine.

3. N-Acryloxyalkyl oxazolidine and N-acryloxyalkyltetrahydro-1,3-oxazine, and the compounds corresponding to the above-said oxazolidines and oxazines where the "alkyl" bond is substituted by alkoxyalkyl and poly(alkoxy-alkyl) group. All these compounds are included in the following formula (III):

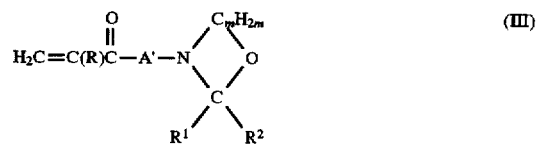

In the above formula (III),

R is H or CH$_3$;

m is an integer of 2–3;

R' is selected from a group comprising hydrogen, phenyl group, benzyl group and (C$_1$–C$_{12}$) alkyl group if it is not linked directly to R$_2$;

R$_2$ is selected from a group comprising hydrogen and C$_1$–C$_4$ alkyl groups, if it is not linked directly to R';

R' and R$_2$ form a C$_5$–C$_6$ ring with the bound carbon atom of the ring in the abovesaid formula when they are bound together. In other words, if they are bound together, it is selected from a group comprising pentamethylene and tetramethylene;

A' is O(C$_m$H$_{2m}$)— or (O-alkylene)$_n$. However, (O-Alkylene)$_n$ is a poly(oxyalkylene) group having its molecular weight in 88–348 range, and alkylene groups are ethylene or propylene groups which may be identical or different.

Compounds of the formula (III) can be hydrolyzed into secondary amines under variety of conditions.

Hydrolysis yields a compound having the following formula (IV):

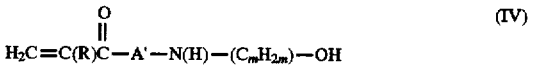

The compounds represented by the above-said formula (III) are disclosed in the Specification of U.S. Pat. No. 3,037,006 and U.S. Pat. No. 3,502,627 owned by the applicant of this patent publication, and also in the Specification of the corresponding patent application and patents filed in the foreign countries, and the monomer compounds disclosed in such Specifications can be used for production of the copolymer to be used in the composition of this invention.

Followings are the examples of the compounds represented by the formula (III): oxazolidinylethyl methacrylate; oxazolidinylethyl acrylate; 3-(g-methacryl-oxypropyl)

tetrahydro-1,3-oxazine; 3-(b-methacryloxyethyl)-2,2-pentamethylene-oxazolidine; 3-b-methacryloxyethyl-2-methyl-2-propyl oxazolidine; N-2-(2-acryloxyethoxy)ethyloxazolidine; N-2-(2-methacryloxyethoxy)ethyloxazolidine; N-2-(2-methacryloxyethoxy)ethyl-5-methyloxazolidine; N-2-(2-acryloxyethoxy)ethyl-5-methyloxazolidine; 3-[2-(2-methacryloxyethoxy)ethyl]-2,2-pentamethylene-oxazolidine; 3-[2-(2-methaacryloxyethoxy)ethyl]-2,2-dimethyl-oxazolidine; and 3-[2-(2-methacryloxyethoxy)ethyl]-2-phenyl-oxazolidine.

4. Polymers of the monomers that can form amines easily by hydrolysis are useful as the amine-containing component or for forming the polymer of the amine-containing component of this binder composition. Examples of such monomers are those represented by the following formula (V) and (VI) such as acryloxy-ketimines and acryloxy-aldimines:

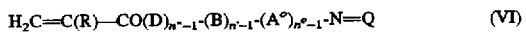

In the above-described formula (V) and (VI),

R is H or $CH_3$; and

Q is selected from the group comprising the following;

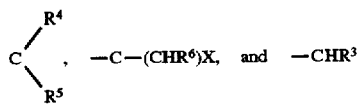

where, $R^6$ is H or may be a methyl group if it is a $CHR^6$ unit;

$R^5$ is selected from a group comprising $C_1$–$C_{12}$ alkyl groups and cyclohexyl group;

$R^4$ is selected from a group comprising $C_1$–$C_{12}$ alkyl groups and cyclohexyl group;

$R^3$ is selected from a group comprising phenyl group, halophenyl groups, $C_1$–$C_{12}$ alkyl groups, cyclohexyl group and $C_1$–$C_4$ alkoxyphenyl groups;

A" is a $C_1$–$C_{12}$ alkylene group;

A°, B and D are oxyalkylene group having identical or different formula —OCH($R^7$)—CH($R^7$) [where, $R^7$ is H, $CH_3$, or $C_2H_5$);

X is an integer 4–5;

n° is an integer 1–200;

n' is an integer 1–200; and n" is an integer 1–200; and n°–1, n'–1, and n"–1 have a value 2–200.

Examples of the compounds represented by the formula (V) and (VI) are indicated in the following: 2-[4-(2,6-dimethylheptylidene)-amino]-ethyl methacrylate; 3-[2-(4methylpentylidine)-amino]-propyl methacrylate; β-(benzilideneamino)-ethyl methacrylate; 3-[2-(4-methylpentylidene)-amino]-ethyl methacrylate; 2-[4-(2,6dimethylheptylidene)-amino]-ethyl acrylate; 12-(cyclopentylidene-amino)-dodecyl methacrylate; N-(1,3-dimethylbutylidene)-2-(2-methacryloxyethoxy)-ethylamine; N(benzilidene)-methacryloxyethoxyethylamine; N-(1,3-dimethylbutylidene)-2-(2acryloxyethoxy)-ethylamine; and N-(benzilidene)-2-(2-acryloxyethoxy) ethylamine.

Compounds represented by the formula (V) and (VI) are hydrolyzed in acidic, neutral or alkaline aqueous medium, to form the corresponding primary amine or its salts whereby the group —N=Q is converted into $NH_2$ or O=Q. Compounds of the formula (V) and (VI) have been disclosed in the Specification of the U.S. Pat. No. 3,037,969 and U.S. Pat. No. 3,497,485, and every monomer compounds disclosed in these Specifications can be used for production of the copolymers which will be used in the water-soluble polymer moiety of the composition of this invention.

The amine-containing polymers of the preferred group of this invention is soluble in water. "Soluble in water" means that the polymer, either in free base form, neutral form or in salt form, is completely soluble in water. The polymer is soluble in water, particularly in a pH range from about 4 to about 10. It is insoluble at higher pH. Even though the water-soluble or partially water-soluble amine-containing polymer may be useful in acidic pH range, and particularly in a pH range from about 4 to about 7, it is not as desirable when compared to the one described above. "Partially water-soluble" means that a part of the polymer is soluble in water, or the entire polymer can dissolve a micelle of individual molecules or as an aggregate, and generally can dissolve as an aggregate swollen by water. The latter form is often called "colloidal solution". It is desirable that majority of the polymer is soluble in acidic pH. The water-soluble amine-containing polymer of this invention, as described above, includes both the perfectly soluble polymers and partially soluble polymers.

Even though the amine-containing polymers to be described in the following which are insoluble in water but have a molecular weight in the lower molecular weight range of the corresponding water-soluble polymers may be useful, but they are not as desirable when compared to the ones described above. These water-insoluble amine-containing polymers have the same function as the water-soluble polymers. To use these water-insoluble polymers as the substitute of the water-soluble polymer, early cohesive strength of the anionically stabilized latex is improved. However, the extent of such improvement is not as great as the extent of improvement obtained by ordinary water-soluble polymers.

Generally, the amine-containing polymers containing at least 20 weight % of the monomers of the above-said categories 1, 2, 3, and 4 can be obtained by solution polymerization in neutral, alkaline or acidic aqueous medium, depending on the type of polymer. Generally speaking, this polymerization is carried out in an aqueous medium containing a small amount of organic or inorganic acid, such as acetic acid or hydrochloric acid. The amine-containing polymer contains the copolymer of upto 80 weight % of one, two or more kinds of monomers such as methyl methacrylate, acrylamide, methacrylamide and/or quarternary ammonium salts derived from amine monomers, such as 2-methacryloxyethyl trimethyl ammonium chloride. A small amount of relatively insoluble comonomer can be used to obtain the water-soluble polymers. The insoluble polymers may contain larger amount of such comonomers. Examples of such monomers are the esters of acrylic acid and $C_1$–$C_{18}$ alcohols, esters of methacrylic acid and $C_1$–$C_{18}$ alcohols particularly $C_1$–$C_4$ alkanols, styrene, vinyl toluene, vinyl acetate, vinyl chloride, vinylidene chloride, substituted styrene, butadiene, substituted butadiene, ethylene, and nitriles and amides of acrylic acid or methacrylic acid. Specific monomer or monomers to be used for preparation of a specific amine-containing polymer depends on the proportion of the amine-containing monomer which is to be used for production of such copolymer. Preferably, the comonomers that have a relatively high solubility in water are used for production of water-soluble polymer. Therefore, these polymers are polymers or copolymers of vinyl monomers that have cationic property and, if so desired, nonionic property. Examples of cationic monomers are amines, imines and quarternary smmonium salts; and other described monomers are nonionic. These water-soluble copolymers do not contain other acidic group(s), except the trace amount of acidic group that might exist due to the contaminant in the monomer used, or due to some degree of hydrolysis that might occur during synthesis, storage or during its use.

Viscosity average molecular weight of the insoluble amine-containing polymer is from about 5,000 to about 100,000, and about 15,000–90,000 range is preferred. Molecular weight of the water-soluble polymer may reach a wide range. Typically, viscosity average molecular weight is from about 5,000 to about 300,000, and about 40,000— about 100,000 is preferred. The amount of amine-containing polymer may be in about 0.1–20 weight % of the total combined weight of the anionic latex polymer and amine-containing polymer, and 1–8 weight % range is particularly preferred.

Volatile base

The quick-drying aqueous paint composition of this invention requires a volatile base. The type and amount of the volatile base to be used must be enough to avoid interaction with the anionically stabilized latex polymer and other anionic components in this quick-drying paint composition, by raising the pH of the composition to the point that the amine functional group of the amine-containing polymer can deprotonate and typically to the pH of at least 5, preferably 7–9.

The approximate value of this starting point of the amount of volatile base required to reach the starting point can be calculated from the number of equivalents of the base required to neutralize the entire conjugated acids of the amine base and the acidic groups (acidic groups from the copolymerized carboxylic acid-holding monomer, surface active agent and initiator) in the latex. If the amine was not thoroughly deprotonated, the emulsion will show the observable symptoms of instability, such as increase of viscosity and microscopically observable "rafting", i.e. early stage aggregation/gelation, regarless of the time. One equivalent of volatile base (based on the titrated amount of latex acid and polyamine) is normally enough to form a stable system. However, a higher level of volatile base (3–4 equivalents) will be required for long-term stability. Even though more volatile bases may be used in the range without deviating from the spirit of this invention, "quick-drying property" of the paint may drop in such case. If the equipment being used in this production method provides an opportunity to lose the volatile base by evaporation at any voluntary stage from when the volatile base was added until when the product is packed in a sealed container, the amount of volatile amine to be added to that production equipment must be increased to cancel out the loss After coating, the volatile base evaporates and the pH of the composition drops. As the pH of the composition drops down to the point at which protonation of the amine functional group starts, the amine functional group will become cationic. While such quick-drying is believed to start by this conversion of the amine functional group into cationic state in the presence of the anionically stabilized emulsion polymer, the exact mechanism that causes such quick dry has not been established. Therefore, the inventors do not wish to be tied to a mechanism of quick dryability.

Examples of appropriate bases are, ammonia, morpholine, alkylamines, 2-dimethylaminoethanol, N-methyl morpholine, ethylenediamine and their mixtures, but it is not limited to these examples. Among them, ammonia is particularly preferred.

Preferred equivalent ratio of the amine and the acid in the latex polymer is amine/acid=0.5–1.0.

Polyvalent metals

The aqueous paint composition of this invention may include water-soluble or water-dispersible polyvalent metal (s) in a form of metallic ion, salt, complex or oxides. While the polyvalent metal may be added after the paint composition has been prepared, it is more desirable to add the other components after modifying the latex polymer with the polyvalent metal. A well-balanced tensile force and % elongation of the latex polymer film can be maintained over a broad temperature range by modifying the latex polymer ahead of time with a polyvalent metal.

While the powder of polyvalent metal may be dispersed in water and added to the aqueous paint composition to serve as the method of modification, it is more desirable to convert the polyvalent metal into a complex of polyvalent metal ion initially to form a salt with the paired ion and to convert the polyvalent metal into water-soluble or water-dispersible form. A complex of polyvalent metal ion can be solubilized in an alkaline solution, such as a dilute ammonia water having a pH of 9–10. Latex polymer can be modified with the polyvalent metal, by adding the water-soluble or water-dispersible polyvalent metal to a latex polymer that is kept at a temperature of 30°–50° C.

Polyvalent metal ions such as calcium, aluminium, magnesium, zinc, barium or strontium, etc. can be used. A complex of polyvalent metal ions, such as zinc hexammonia, zinc ammonium bicarbonate, etc., and paired ion with the polyvalent metal ion, such as the salt formed with chloride ion, acetate ion, or bicarbonate ion can be used. Zinc is the most desirable polyvalent metal.

The amount of polyvalent metal ion, salt, complex or oxide to be used is from about 0.1 weight % to about 10 weight %, based on the weight of the polymer solid content of the latex. Preferred amount is from about 0.3 weight % to about 2.0 weight %, based on the weight of the polymer solid content of the latex.

Furthermore, ordinary paint components such as pigment, binder, vehicle, extender, dispersing agent, surface active agent, compounding agent, moisturizing agent, rheology modifying agent, tackifying agent, dry-delaying agent, antifoam, coloring agent, wax, preservative, thermal stabilizer, solvent, tension preventing agent, and/or desiccant, etc. may be used in this invention.

In selecting the type and quantity of additives, one must be cautious enough to avoid changing the pH of the paint composition to the extent of interfering with its storage stability or to avoid adjusting the pH to the extent that can not lower the pH enough to initiate protonation of the polyamine.

Typically, the aqueous paint composition of this invention is prepared to have a solid content from about 10 to about 75 weight % and a viscosity from about 5,000 to about 500,000 centipoises.

And, generally it will have a quicker dryability, the higher is the concentration of solids.

The aqueous paint composition of this invention may contain a filler such as sand or calcium carbonate. Typically this paint may be coated by a sprayer, to a thickness from about ⅟₃₂th of an inch to about ⅛th of an inch.

The aqueous paint composition of this invention has the effect of having low sensitivity to temperature, having high rubber elasticity and excellent quick dryability. It also permits coating and drying under extremely low temperature such as 0°–5° C. and high humidity condition such as 80–90%. The terminology "low sensitivity to temperature"

means that it has a lower dependency on temperature, compared to the conventional composition. And, the value obtained by dividing the tensile strength at −20° C. by the tensile strength at 20° C. can be used as the measure of rubber elasticity. A smaller value is understood to have a higher rubber elasticity.

The quick-drying aqueous paint composition of this invention can be used as the mid-coating multilayer elastic paint to serve as the EWC (Elastomeric Wall coating) that requires quick dryability due to thickness of the film. And, it can be used for single layer elastic paint because it does not have tack and is resistant to soiling. Furthermore, it can be used for caulking and puttying because it has a low shrinkage. Furthermore, it can be used as the adhesive for building materials that can be used both in summer and winter, adhesive for the OPP tapes, adhesives for labels, back coat of car sheet metal (that can withstand the increase of the temperature inside the vehicle), application in various fibers, various types of adhesives, and as the elastic floor materials such as the middle coat for tennis courts, and racing tracks. Furthermore, it can be used as quick-drying interior or exterior emulsion paint, such as traffic paint, top coat of multilayer elastic paint, paint for waterproofing the roof, paint for ordinary building materials, and paints for bathroom, etc.

This invention is explained further by way of the following examples which, however, are merely the examples and are not intended to limit the scope of this invention.

EXAMPLE 1

Preparation of monomer mixture 31.6 g of 58 % Polyoxyethylene nonylphenyl ether ammonium sulfate solution was dissolved in 3687.8 g deionized water. Emulsified monomer mixture was prepared by adding the following monomers slowly to the agitated solution.

| Monomer | Weight (g) | Total monomer weight (%) |
|---|---|---|
| 2-Ethylhexyl acrylate | 4065.0 | 44.0 |
| Butyl methacrylate | 2771.6 | 30.0 |
| Methyl methacrylate | 2281.9 | 24.7 |
| Methacrylic acid | 120.1 | 1.3 |

Polymerization procedure, preparation of emulsion polymer

A solution containing 70.1 g polyoxyethylenenonylphenyl ether ammonium sulfate and 3118.0 g deionized water was placed in an appropriate reactor equipped with a thermometer, a cooling condensor and an agitator, and it was heated to 80°–85° C.

Aqueous sodilum carbonate solution (a solution prepared by dissolving (32.3 g) sodium carbonate in 169.4 g deionized water and the entire monomer emulsion (531.2 g) were added sequentially in this reactor, and the temperature was adjusted to 80°–82° C. The entire aqueous sodium persulfate (SPS) solution (a solution prepared by dissolving 33.1 g SPS in 169.3 g deionized water was added to this reactor. Within about 5 minutes, initiation of polymerization was confirmed by the increase of temperature by 3°–5° C. and change of the external appearance of the reaction mixture. After generation of heat had ended, the remainder of the monomer mixture and the aqueous sodium persulfate (SPS) solution (a solution prepared by dissolving 7.7 g SPS in 384.9 g deionized water were added slowly to the reactor. Addition was made for a period of 2–3 hours in such a way that the heat generated by polymerization reaction could be removed by cooling. Polymerization reaction temperature was maintained at 80°–82° C. by cooling, if necessary. After completing the addition, the reactor that contained the reaction mixture and the feeding pipes were rinsed with 215.6 g deionized water, and the rinse was addded back to the reactor. The thus-obtained emulsion polymer was either cooled to room temperature or maintained at an appropriate temperature for addition of aqueous polyvalent metal solution and water-dispersible amine functional group-containing polymer.

Four emulsion polymers were prepared by the above-described operation, and samples 1–4 having the formula shown in Table 3 were prepared.

For preparation, the emulsion polymer was kept at 40° C., the aqueous polyvalent metal solution was added to the reactor, the pH was adjusted to 9.0–10.0 with aqueous 28% ammonia solution, and finally polyoxazolidinyl ethyl methacrylate (solids content=27.5%) which was the water-dispersible amine functional group-containing polymer was added.

And, each of the samples 1–4 was casted in a Petri dish coated with a mold-releasing agent, in such an amount to form a film of about 2 mm in thickness, and then it was dried for 10 days at 70° C. and 40% relative humidity. The dry film was cut into 25 inch wide strip by using a dumbell-shaped die, with a gripping width of 1 inch, and tensile test was carried out at a test speed of 2 inches/minute, to measure the % elongation to break the film and the maximllm strength. Results are presented in Table 4.

TABLE 3

[Unit: g]

| | Aqueous polyvalent metal solution | | | | |
|---|---|---|---|---|---|
| Sample No. | Deionied water | Ammonium bicarbonate | 28% Aqueous ammonia solution | Zinc oxide | Water-dispersible amine functional group-containing polymer |
| 1 | 0.0 | 0.0 | 0.0 | 0.0 | 0.0 |
| 2 | 388.0 | 65.0 | 111.9 | 57.7 | 0.0 |
| 3 | 0.0 | 0.0 | 0.0 | 0.0 | 671.9 |
| 4 | 388.0 | 65.0 | 11.9 | 57.7 | 671.9 |
| 5 | 0.0 | 0.0 | 0.0 | 0.0 | 0.0 |
| 6 | 372.1 | 59.0 | 123.6 | 55.4 | 0.0 |
| 7 | 0.0 | 0.0 | 0.0 | 0.0 | 644.9 |
| 8 | 372.1 | 59.0 | 123.6 | 55.4 | 644.9 |

TABLE 4

| Sample No. | Zinc (%) | Polyoxazolidinyl ethyl methacrylate (%) | Tensile strength (kg/cm$^2$) | Elongation at break (%) |
|---|---|---|---|---|
| 1 | 0 | 0 | 4.5 | 921 |
| 2 | 0.5 | 0 | 13.5 | 523 |
| 3 | 0 | 2 | 12.4 | 497 |
| 4 | 0.5 | 2 | 15.3 | 315 |
| 5 | 0 | 0 | 1.7 | >1000 |
| 6 | 0.5 | 0 | 7.3 | 622 |
| 7 | 0 | 2 | 4.7 | 820 |
| 8 | 0.5 | 2 | 6.7 | 781 |

EXAMPLE 2

Preparation of monomer mixture 30.6 g of 58% polyoxyethylene nonylphenyl ether ammonium sulfate solution was dissolved in 2643.3 g deionized water, and the following monomers were added slowly to the agitated solution, to prepared an emulsified monomer mixture.

| Monomer | Weight (g) | Total monomer weight (%) |
| --- | --- | --- |
| 2-Ethylhexyl acrylate | 6207.3 | 70.0 |
| Butyl methacrylate | 2545.2 | 28.7 |
| Methacrylic acid | 115.2 | 1.3 |

Polymerization procedure, preparation of emulsion polymer

A solution containing 30.6 g polyoxyethylene nonylphenyl ether ammonium sulfate and 3359.7 g deionized water was placed in an appropriate reactor equipped with a thermometer, a cooling condensor and an agitator, and it was heated to 80°–85° C.

An aqueous ammonium carbonate solution (a solution prepared by dissolving 31.0 ammonium carbonate in 180.9 g deionized water and the above-said monomer emulsion (510.3 g) were added in sequence and the temperature was adjusted to 80°–82° C. The entire aqueous ammonium persulfate (APS) solution (a solution prepared by dissolving 31.9 g APS in 162.9 g deionized water was added to this reactor. Within about 5 minutes, initiation of polymerization reaction was confirmed by the increase of temperature by 3°–5° C. and change of the external appearance of the reaction mixture. After heat generation had ended, the remainder of the reaction mixture was added slowly to the reactor. It was added over a period of 2 3 hours so that the heat generated from the polymerization reaction could be removed by cooling. The polymerization reaction temperature was maintained at 80°–82° C. by cooling, if necessary. After finishing the addition, the reactor that contained the reaction mixture and the feeding pipes were rinsed with 204.3 g deionized water, and the rinse was added back to the reactor. The thus-obtained emulsion polymer was cooled to room temperature, or kept at an appropriate temperature for addition of the aqueous polyvalent metal solution and water-dispersible amine functional group-containing polymer.

Four emulsion polymers were prepared by the above-described procedure, and samples 5–8 were prepared by the formula shown in Table 3.

For preparation, the emulsion polymer was maintained at 40° C., the aqueous polyvalent metal solution was added to the reactor, the pH was adjusted to 9.0–10.0 by using an aqueous 28% ammonia solution, and finally polyoxazolidinyl ethyl methacrylate (solids content=27.5%) which was the water-dispersible amine functional group-containing polymer was added.

Films were prepared by the method of Example 1, and % elongation and maximum strength were measured at 21° C. Results are presented in Table 4.

EXAMPLE 3

Preparation of monomer mixture 47.0 g of 24% Sodium dodecylbenzene sulfonate solution and 55.0 g of 30.7% polyoxyethylene aryl ether sodium sulfate solution were dissolved in (2748.5 g) deionized water, and then the following monomers were added slowly to the agitated solution, to prepare an emulsified monomer mixture.

| Monomer | Weight (g) | Total monomer weight (%) |
| --- | --- | --- |
| 2-Ethylhexyl acrylate | 7564.8 | 80.0 |
| Butyl methacrylate | 1036.8 | 11.0 |
| Methyl methacrylate | 665.3 | 7.0 |
| Methacrylate | 192.0 | 2.0 |

Polymerization procedure, preparation of emulsion polymer

A solution containing 31.4 g of 24% sodium dodecylbenzene sulfate solution, 37.4 g 30.7% polyoxyethylene aryl ether sodium sulfate, and 490.6 g deionized water were placed in an appropriate reactor equipped with a thermometer, a cooling condensor and an agitator, and it was heated to 80°–85° C.

An aqueous ammonium carbonate solution (a solution prepared by dissolving 33.1 g ammonium carbonate in 193.0 g deionized water and the entire amount of the above-said monomer suspension (544.3 g) were added in sequence to this reactor, and the temperature was adjusted to 80°–82° C. Then the entire amount of the aqueous ammonium persulfate (APS) solution (a solution prepared by dissolving 34.1 g APS in 129.6 g deionized water was added to this reactor. Within about 5 minutes, initiation of the polymerization reaction was confirmed by the increase of temperature by 3°–5° C. and change of the external appearance of the reaction mixture. After heat generation had ended, the remainder of the reaction mixture was added slowly. It was added over a period of 2–3 hours in such a way that the heat generated by the polymerization reaction could be removed by cooling. Polymerization reaction temperature was maintained at 80°–82° C. by cooling, if necessary. After finishing the addition, the reactor that contained the reaction mixture and the feeding pipes were rinsed with (217.9 g) deionized water, and the rinse was added back to the reactor. The reactor was cooled down to 45° C., added with 130.5 g 70% octylphenyl polyethoxy ethanol, and the reactor and the feeding pipes were rinsed with 139.2 g deionized water, and the rinse was added back to the reactor. The thus-obtained emulsion polymer was cooled to room temperature, or maintained at an appropriate temperature for addition of the aqueous polyvalent metal solution and water-dispersible amine functional group-containing polymer.

Nine emulsion polymers were prepared by the above-described procedure, and samples 9–17 were prepared according to the formula shown in Table 5. Sample 15 is a Comparative Example. For preparation, the emulsion polymer was maintained at 40° C., the above-said aqueous polyvalent metal solution was added to the reactor, pH was adjusted to 9.0–10.0 with an aqueous 28% ammonia solution, and finally, the polyoxazolidinylethyl methacrylate (solid content=27.5%) which was the water-dispersible smine functional group-containing polymer was added.

Films were prepared by the method of Example 1, and % elongation and maximum strength were determined. Results are presented in Table 6.

TABLE 5

| | | | | | [Unit: g] |
| --- | --- | --- | --- | --- | --- |
| | | Aqueous polyvalent metal solution | | | |
| Sample No. | Deionied water | Ammonium bicarbonate | 28% Aqueous ammonia solution | Zinc oxide | Water-dispersible amine functional group-containing polymer |
| 9 | 435.8 | 93.6 | 194.9 | 82.6 | 0.0 |
| 10 | 435.8 | 93.6 | 194.9 | 82.6 | 87.4 |
| 11 | 435.8 | 93.6 | 194.9 | 82.6 | 699.2 |
| 12 | 435.8 | 66.7 | 139.2 | 59.0 | 0.0 |
| 13 | 435.8 | 66.7 | 139.2 | 59.0 | 87.4 |
| 14 | 435.8 | 66.7 | 139.2 | 59.0 | 699.2 |
| 15 | 518.4 | 0.0 | 0.0 | 0.0 | 0.0 |
| 16 | 518.4 | 0.0 | 0.0 | 0.0 | 87.4 |
| 17 | 518.4 | 0.0 | 0.0 | 0.0 | 699.2 |

TABLE 6

| Sample No. | Zinc (%) | Polyoxazoli-dinylethyl methacrylate (%) | −20° C. Tensile strength (kg/cm²) | −20° C. Elongation at break (%) | +20° C. Tensile strength (kg/cm²) | +20° C. Elongation at break (%) | +60° C. Tensile strength (kg/cm²) | +60° C. Elongation at break (%) |
|---|---|---|---|---|---|---|---|---|
| 9 | 0.70 | 0 | 35.6 | 710 | 5.7 | 565 | 3.4 | 520 |
| 10 | 0.70 | 0.25 | 35.5 | 525 | 5.6 | 710 | 3.3 | 460 |
| 11 | 0.70 | 2.0 | 23.6 | 455 | 5.4 | 510 | 3.0 | 310 |
| 12 | 0.50 | 0 | 21.1 | 530 | 6.0 | 745 | 3.4 | 530 |
| 13 | 0.50 | 0.25 | 34.5 | 805 | 8.2 | 940 | 3.2 | 455 |
| 14 | 0.50 | 2.0 | 27.4 | 475 | 5.6 | 740 | 2.5 | 370 |
| 15 | 0 | 0 | 9.6 | 1030 | 1.5 | >1400 | 0.6 | >1400 |
| 16 | 0 | 0.25 | 12.0 | 975 | 1.9 | >1400 | 1.5 | 1100 |
| 17 | 0 | 2.0 | 24.6 | 1250 | 4.1 | >1400 | 2.4 | 840 |

After coating the samples 15–17 by means of a 5 mil applicator on glass plates at 5° C. and 80% relative humidity, the surface of the film was rubbed with a finger, and the times required to dry and by the film to show skinning time were measured. Results are as follows.

| Sample No. | Skinning Time | Time required to dry |
|---|---|---|
| 15 | 40 minutes | 70 minutes |
| 16 | 40 minutes | 60 minutes |
| 17 | 10 minutes | 40 minutes |

EXAMPLE 4

Emulsions having the compositions shown in Table 7 were synthesized by the method identical to the method shown in Example 1.

After coating the thus-obtained emulsion by means of a 5 mil applicator on a glass plate at 22°–23° C. and 60% relative humidity, surface of the film was rubbed with a finger to measure the time required by the film to show skinning and to reach a complete dryness. Results are presented in Table 8.

BMA: Butyl methacrylate
SLS: Sodiumlaurylsulfate
DS-4: Sodium dodecylbenzene sulfonate
C0-436: Ammonium polyoxyethylnonylphenyl sulfonate

TABLE 8

| Sample No. | Polyoxazolidinyl ethyl methacrylate (% s/s) | Drying time (minutes) Touching by finger | Drying time (minutes) Semi-hardened | Viscosity (cps, 60 rpm) | pH |
|---|---|---|---|---|---|
| 18 | 0 | 20 | 25 | 215 | 10.1 |
|  | 2 | 10 | 15 | 125 | 9.9 |
|  | 5 | 10 | 15 | 660 | 9.8 |
| 19 | 0 | 25 | 30 | 216 | 10.3 |
|  | 2 | 15 | 20 | 232 | 9.8 |
|  | 5 | 15 | 30 | 920 | 9.7 |
| 20 | 0 | >40 | >40 | 132 | 10.1 |
|  | 2 | 40 | >40 | 8650 | 10.0 |
|  | 5 | 30 | >40 | 8400 | 9.8 |
| 21 | 0 | 40 | >40 | 75 | 10.0 |
|  | 2 | 30 | 40 | 5900 | 9.9 |
|  | 5 | 30 | 40 | 5800 | 9.8 |
| 22 | 0 | 40 | >40 | 163 | 10.1 |
|  | 2 | 20 | 25 | 95 | 10.0 |

TABLE 7

| Sample No. | Composition | Tg | Surface active agent | Solubility |
|---|---|---|---|---|
| 18 | 45.6 BA/53.1 MMA/1.3 MAA | +25 | SLS | 0.80 |
| 19 | 65.6 BA/33.1 MMA/1.3 MAA | 0 | SLS | 0.57 |
| 20 | 57 2-EHA/41.7 Sty/1.3 MAA | 0 | SLS | 0.018 |
| 21 | 57 2-EHA/41.7 Sty/1.3 MAA | 0 | CO-436 | 0.018 |
| 22 | 57 2-EHA/41.7 MMA/1.3 MAA | 0 | CO-436 | 0.018 |
| 23 | 44 2-EHA/24.7 MMA/30 BMA/1.3 MAA | 0 | CO-436 | 0.384 |
| 24 | 70.0 2-EHA/28.7 BMA/1.3 MAA | −38 | DS-4 | 0.016 |
| 25 | 70.0 2-EHA/28.7 BMA/1.3 MAA | −38 | CO-436 | 0.016 |
| 26 | 79.7 2-EHA/19.0 BMA/1.3 MAA | −46 | CO-436 | 0.017 |
| 27 | 79.7 2-EHA/15.0 BMA/4.0 MMA/1.3 MAA | −44 | CO-436 | 0.067 |
| 28 | 79.7 2-EHA/18.7 BMA/1.6 MMA | −46 | CO-436 | 0.013 |
| 29 | 80.2 2-EHA/17.8 BMA/2.0 MAA | −45 | CO-436 | 0.013 |
| 30 | 80.0 2-EHA/11.0 BMA/7.0 MMA/2.0 MAA | −40 | CO-436 | 0.11 |

In these tables, the symbols represent the following.
BA: Butyl acrylate
MMA: Methyl methacrylate
MAA: Methacrylic acid
2EHA: 2-Ethylhexyl acrylate
Sty: Styrene TABLE 8-continued

| Sample No. | Polyoxazolidinyl ethyl methacrylate (% s/s) | Touching by finger | Semi-hardened | Viscosity (cps, 60 rpm) | pH |
|---|---|---|---|---|---|
|  | 5 | 15 | 25 | 660 | 9.8 |
| 23 | 0 | 40 | >40 | 151 | 10.1 |
|  | 2 | 10 | 15 | 176 | 10.0 |
|  | 5 | 20 | 25 | 820 | 9.8 |
| 24 | 0 | 40 | >40 | 248 | 9.9 |
|  | 2 | 10 | 15 | 2480 | 9.8 |
|  | 5 | 20 | 40 | 5900 | 9.7 |
| 25 | 0 | 40 | >40 | 303 | 10.0 |
|  | 2 | 5 | 10 | 460 | 9.9 |
|  | 5 | 15 | 40 | 3050 | 9.8 |
| 26 | 0 | 25 | 40 | 373 | 9.8 |
|  | 2 | 5 | 10 | 2500 | 9.8 |
|  | 5 | 15 | 25 | 5900 | 9.7 |
| 27 | 0 | >40 | >40 | 410 | 9.9 |
|  | 2 | 5 | 10 | 480 | 9.9 |
|  | 5 | 15 | 30 | 1030 | 9.7 |
| 28 | 0 | >40 | >40 | 300 | 9.9 |
|  | 2 | <5 | 5 | 460 | 9.8 |
|  | 5 | 5 | 10 | 980 | 9.7 |
| 29 | 0 | >40 | >40 | 260 | 9.7 |
|  | 2 | 5 | 10 | 310 | 9.7 |
|  | 5 | 10 | 15 | 900 | 9.6 |
| 30 | 0 | >40 | >40 | 700 | 9.8 |
|  | 2 | 10 | 20 | 500 | 9.7 |
|  | 5 | 10 | 15 | 1080 | 9.6 |

EXAMPLE 5

Paints were prepared from the sample 13 obtained in Example 4 and using the following formula, and properties of the film were determined.
Paint protocol

|  | Weight parts |
|---|---|
| Dispersed paste |  |
| Water | 13.6 |
| Ethyleneglycol | 4.4 |
| Orotan ® 850 | 0.8 |
| KTPP | 0.3 |
| Nopco NXZ | 0.3 |
| Titanium oxide | 14.3 |
| Calcium carbonate | 23.9 |
| Preparation of Paint |  |
| Above-said dispersion paste | 57.6 |
| Sample 13 (solid content = 53%) | 41.2 |
| Texanol ® | 0.6 |
| Skane ® M8 | 0.3 |
| Nopco NXZ | 0.3 |

PVC = 35%
NV = 60%

Contents of each products described above are as follows.
Orotane® 850: Dispersing agent (a product of Rohm and Haas Company)
KTPP: Potassium tripolyphosphate
Nopco NXZ: Antifoam (a product of Sunopco)
Texanol®: Co-film-forming agent (a product of Eastman Kodak Co.)
Skane® M8 (SIC): Preservative (a product of Rohm and Haas Company)

Films were prepared from the above-described paints under the conditions of Example 1, and its properties were evaluated. Results are presented in Table 9.

TABLE 9

| Temperature | Tensile strength (kg/cm$^2$) | Elongation at break (%) |
|---|---|---|
| −20° C. | 41.3 | 149.5 |
| 20° C. | 13.5 | 263.0 |
| 60° C. | 10.0 | 107.5 |

What is claimed is:

1. Aqueous paint composition, comprising:

(1) a latex which is a film-forming latex polymer having anionic property, where the solubility of the polymer-forming monomers to form the polymer, excluding the monomers having anionic property, is 0.01–1.50 g per 100 g of water, (2) water-soluble or water-dispersible polymer, formed from a monomer mixture that contains at least 20 weight % of amine functional group containing monomers, and (3) from one to four equivalents of a volatile base selected from the group consisting of ammonia, morpholine, alkylamines, 2-dimethylaminoethanol, N-methyl morpholine, ethylenediamine and their mixtures, based on a titrated amount of latex acid and polyamine.

2. The aqueous paint composition according to claim 1, where the solubility of the monomers to form the film-forming latex polymer having anionic property, excluding the monomers that show anionic property, is 0.1–0.9 g per 100 g of water.

3. The aqueous paint composition according to claim 1, where the amount of water-soluble or water-dispersible polymer formed from the amine funcntional group-containing monomers is 0.02–20 weight % of the total combined amount of the latex polymer and the water-soluble or water-dispersible polymer.

4. The aqueous paint composition according to claim 1, where the latex polymer is polymerized from a monomer mixture containing butyl methacrylate.

5. The aqueous paint composition according to claim 4, where the amount of butyl methacrylate is 1–70 weight % of the monomer mixture.

6. The aqueous paint composition according to either one of the claims 1 through 5, containing additional water-soluble or water-dispersible polyvalent metal.

7. The aqueous paint composition according to claim 6, where the water-soluble or water-dispersible polyvalent metal is zinc.

8. Aqueous paint composition, comprising 1) a latex which is a film-forming latex polymer having anionic property, where the solubility of the monomers to form the polymer, excluding the monomers having anionic property, is 0.01–1.50 g per 100 g of water, and (2) water-soluble or water-dispersible polyvalent metal.

9. Aqueous paint composition, comprising a latex which is a film-forming latex polymer having anionic property, modified by water-soluble or water-dispersible polyvalent metal, where the solubility of the monomers to form the polymer, excluding the monomers having anionic property, is 0.01–1.50 g per 100 g of water reacted with a water-soluble or water-dispersible polyvalent metal.

10. The aqueous paint composition according to claim 8 or claim 9, where the water-soluble or water-dispersible polyvalent metal is zinc.

11. Aqueous paint composition, comprising:

(1) a latex which is a film-forming latex polymer having anionic property, modified by water-soluble or water-dispersible polyvalent metal, where the solubility of the monomers to form the polymer, excluding the monomers having anionic property, is 0.01–1.50 g per 100 g of water, (2) water-soluble or water-dispersible polymer, formed from a monomer mixture containing at least 20 weight % of amine functional group-containing monomer, and (3) from one to four equivalents of a volatile base selected from the group consisting of ammonia, morpholine, alkylamines, 2-dimethylaminoethanol, N-methyl morpholine, ethylenediamine and their mixtures, based on a titrated amount of latex acid and polyamine.

12. The aqueous paint composition according to claim 11, where the water-soluble or water-dispersible polyvalent metal is zinc.

* * * * *